United States Patent [19]
Wyler

[11] 4,314,483
[45] Feb. 9, 1982

[54] MASS RATE OF FLOW METER WITH IMPROVED TEMPERATURE CHARACTERISTICS

[75] Inventor: John S. Wyler, Andover, Mass.

[73] Assignee: General Electric Company, Wilmington, Mass.

[21] Appl. No.: 84,505

[22] Filed: Oct. 12, 1979

[51] Int. Cl.³ .............................................. G01F 1/80
[52] U.S. Cl. .................................. 73/861.35; 277/53
[58] Field of Search ........................ 73/861.35, 861.36; 277/55, 56, 53, 3

[56] References Cited

U.S. PATENT DOCUMENTS

| | | | |
|---|---|---|---|
| 1,187,212 | 6/1916 | Westinghouse | 277/56 |
| 3,231,285 | 1/1966 | Weltmer et al. | 277/53 |
| 3,251,601 | 5/1966 | Harvey | 277/53 |
| 3,739,444 | 6/1973 | Vargo | 277/56 |
| 4,012,957 | 3/1977 | Chiles et al. | 73/861.35 X |
| 4,056,976 | 11/1977 | Hildebrand et al. | 73/861.35 |

FOREIGN PATENT DOCUMENTS 538984  6/1922  France .................................. 277/53

Primary Examiner—Herbert Goldstein
Attorney, Agent, or Firm—I. David Blumenfeld

[57] ABSTRACT

A mass rate of flow meter including a housing and an inner assembly with a swirl generator, a rotor, and a restrained reaction turbine. The rotor includes tapered passages. Each tapered passage includes a converging inlet section and a diverging outlet section for imparting uniform velocity to the fluid stream. The inner housing forms a double labyrinth seal between the rotor and the housing and another double labyrinth seal between the turbine and the housing.

13 Claims, 4 Drawing Figures

MASS RATE OF FLOW METER WITH IMPROVED TEMPERATURE CHARACTERISTICS

BACKGROUND OF THE INVENTION

The present invention relates to a mass rate of flow meter of the angular momentum type having a swirl generator for imparting angular momentum to the measured fluid, a rotor that is rotated by the fluid stream, and a restrained reaction turbine for removing the imparted angular momentum. More particularly, the invention relates to a flowmeter of the above-mentioned type having improved rotor and turbine constructions for improving the performance of a flowmeter over a wide range of temperatures.

A mass rate of flow meter of the angular momentum type relating to the present invention is disclosed by Hildebrand et al in U.S. Pat. No. 4,056,976, issued Nov. 8, 1976, titled "Mass Rate of Flow Meter", and assigned to the same assignee as the present invention. This patent shows a mass flowmeter in which a swirl generator imparts angular momentum to the fluid to be measured. Immediately downstream from the swirl generator is an unrestrained rotor. Swirling fluid from the swirl generator is directed through passageways in the rotor provided by multiple cylindrical tubes, causing the unrestrained rotor to rotate at the average velocity of the fluid stream. The restrained reaction turbine is similar to the rotor, having passageways formed by multiple tubes through which fluid from the rotor flows. In this flowmeter, the angular momentum of the fluid stream angularly displaces the turbine until the bias of a restraining spring balances the torque on the turbine, allowing measurement of flow rate by means not material to the present invention and not described here.

When such flowmeters are used to measure the flow of fuel in an aircraft, both the fuel and the flowmeter are subjected to a wide range of operating temperatures. The effect on the fuel is manifested, in part, by a change in fuel viscosity which, in turn, can lead to inaccurate indications of flow measurements. More specifically, it appears that the momentum imparted to the rotor and leakage through the flowmeter past the rotor and turbine become dependent upon viscosity, and, therefore temperature.

Referring first to the changes in momentum, prior flowmeters utilize plural, cylindrical tubes to form the rotor passageways. Such construction is shown in U.S. Pat. No. 2,148,150 by Cornell, issued Aug. 9, 1960, and titled "Mass Flowmeter Baffle"; this patent is assigned to the same assignee as the present invention. Given a constant viscosity, the pattern of fluid flow, or flow profile, becomes nearly constant over a wide range of flow rates and establishes a radius of gyration. Thus, it is possible to calibrate the flowmeter because the radius of gyration remains nearly constant. However, when the viscosity changes, the flow profile and the radius of gyration also change, and these changes manifest themselves as errors in the readings.

Now referring to leakage through the flowmeter, it is desirable that the rotor and turbine move with as little friction as possible. This allows the angular speed of the rotor to be solely a function of the angular velocity of the fuel leaving the rotor. It also allows the displacement of the turbine to be determined by the restraining spring. Thus, the outer peripheries of rotor and turbine must not contact the inner surfaces of the housing. Moreover, the need to minimize friction restricts the possible sealing methods that might be used to prevent leakage, especially at low flow rates. To date flowmeters are constructed with a small, annular clearance between the housing and each of the rotor and turbine. Some leakage does occur through this clearance, but in the past this has been compensated during calibration.

In current applications of these flowmeters, this leakage can introduce inaccuracies into flow indications. As the viscosity of the fuel changes, the percentage of fuel leaking through the clearance also can change in an unpredictable manner. Moreover, at low fuel flow rates, the fuel that passes through the clearance, and therefore is not measured, can become a significant percentage of the total fuel passing through the flowmeter. These changes in leakage are not easily compensated and so it is possible that inaccurate readings can be obtained.

SUMMARY

Accordingly, it is an object of the present invention to improve the performance of an angular momentum type of mass rate of flow meter over a wide range of operative temperatures.

It is another object of the present invention to provide a rotor construction that improves the operation of an angular momentum type of mass rate of flow meter over a wide range of operating temperatures.

It is a further object of the present invention to provide an angular momentum type of mass rate of flow meter in which leakage past the rotor and turbine is reduced.

In accordance with one aspect of this invention, the rotor of a mass rate of flow meter includes plural, tapered, flow-conveying passages. Each passage has a converging inlet section for imparting uniform flow velocity to incoming fluid and a diverging outlet section for decreasing uniform flow velocity of the outgoing fluid. This produces a flow profile that is more nearly constant over a wide range of operating temperatures.

In accordance with another aspect of this invention, the clearance between the housing and each of the rotor and the turbine includes a double labyrinth seal. Each seal is formed by the housing and by either the rotor or turbine. These seals minimize leakage between the housing and each of the rotor and turbine without altering the characteristic friction of the rotor and turbine.

This invention is pointed out with particularity in the appended claims. The above and further objects of this invention may be better understood by referring to the following description taken in conjunction with accompanying drawings.

DESCRIPTION OF AN ILLUSTRATIVE EMBODIMENT

Figure 1:
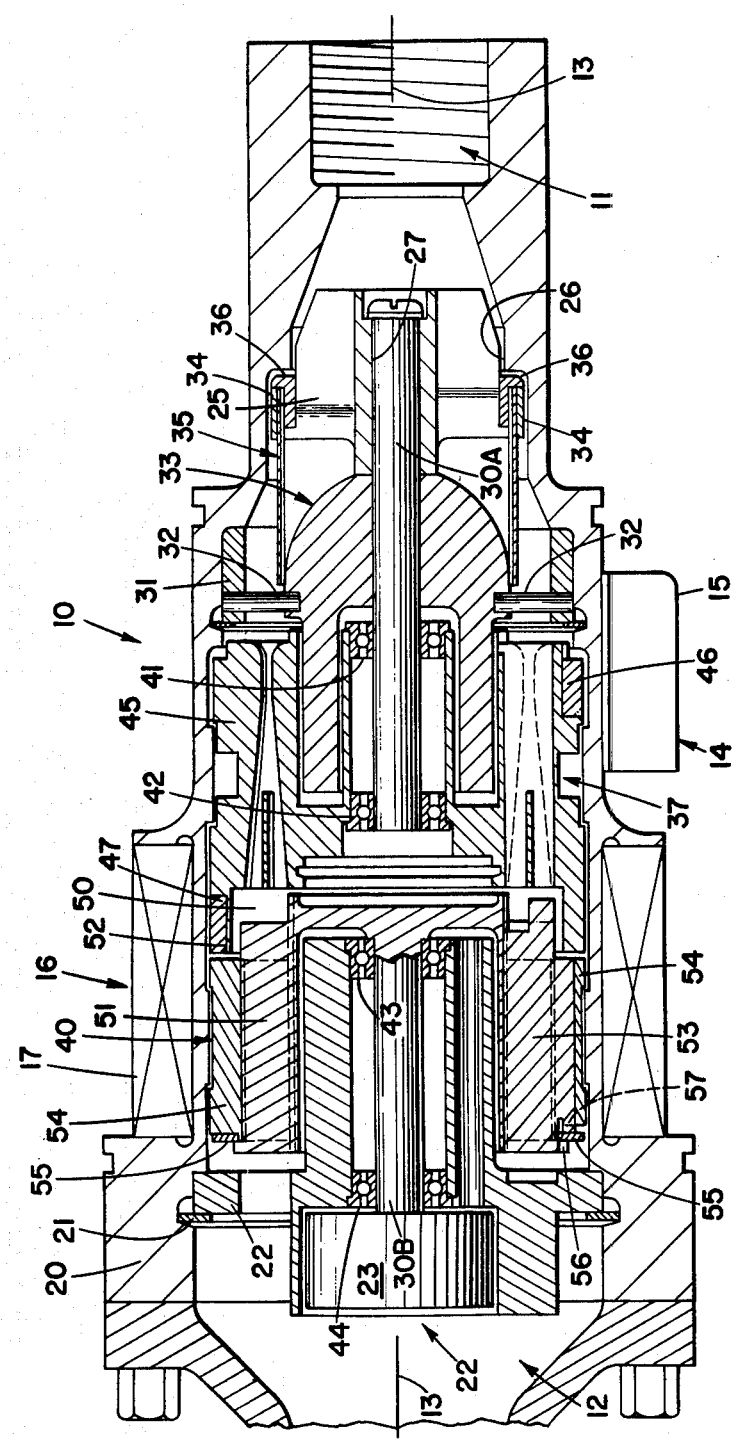
FIG. 1 is a longitudinal view, in cross-section, of a mass rate of flow meter embodying this invention.

FIG. 1 illustrates an exemplary flowmeter that incorporates this invention. It comprises a housing 10 having an inlet port 11 and an outlet port 12 at the ends of the housing 10 which, with other elements of the flowmeter, defines a generally annular passage for a fluid, such as aircraft fuel. The passage is generally disposed along a longitudinal axis 13. A first sensing coil assembly 14 generates first timing, or start, pulses and is affixed to the housing 10. The assembly 14 has a longitudinal axis that is perpendicular to the axis 13 and is secured in a shield 15.

A second sensing coil assembly 16 generates second, or stop, timing pulses and is also affixed to the housing 10. The assembly 16 has a longitudinal axis that is coincident with the axis 13 and includes a sensing coil 17 that is disposed at a flange 20 at the outlet port 12. Conductors from both the first sensing coil assembly 14 and the second sensing coil assembly 16 terminate at a connector assembly (not shown). Both the coil assemblies 14 and 16 are isolated from the flow of a fluid through the housing 10.

A first, or turbine, inner assembly is radially positioned on the housing 10 by a cohesing end flange 20, and an end assembly 22 and is axially positioned by a retaining ring 21 that connects with an end assembly 22 that also supports a spring mechanism 23. At the inlet port 11, a second, or rotor, inner assembly includes a flow straightener 24, that comprises a plurality of longitudinally extending, circumferentially spaced vanes 25. The flow straightener 24 is positioned in a tapered box 26 and is mounted to one end of a shaft 30A. An aligned shaft 30B is supported by the end assembly 22 and lies on the longitudinal axis 13.

A forward strut element in the rotor assembly comprises a stationary annulus 31 and a plurality of struts 32 that extend inwardly from the annulus 31 and that support a swirl generator 33. The annulus 31 radially positions the rotor assembly and connects with a retaining ring 31A to axially position the rotor assembly on the housing. The second generator 33 supports the shaft 30A. A flanged ring 34 is carried on the outer surface of the vanes 25 and supports one end of a variable diameter conduit 35 that provides a plurality of spring fingers encircling the swirl generator 33 and that acts as a flow responsive valve as described later. A second ring 36 clamps the conduit 35 and the ring 34 to the vanes 25. This ring 36 also connects with the housing 10 to radially position the shaft 30A.

A rotor 37 and a turbine 40 are journaled on shafts 30A and 30B respectively in an axially spaced relationship. Thrust bearings 41 and 42 support and position the rotor 37 on the shaft 30A; thrust bearings 43 and 44, the turbine 40 on the shaft 30B. A flat band, helical spring (not shown) in the spring mechanism is clamped between the turbine 40 and the shaft 30B to restrain rotation of the turbine 40 about the shaft 30B.

An outer annulus 45 on the rotor 37 supports a group of permanent bar magnets 46 in the periphery of the rotor 37. These magnets are disposed to produce a north-south magnetic axis along a chord near the periphery of the rotor 37. Each time the magnets 46 rotate past the sensing coil assembly 14, a start pulse is induced in the coil assembly 14 that indicates the passage of a predetermined point on the rotor 37 (i.e., the location of the magnets 46) past a predetermined point on the housing 10 (i.e., the location of the coil assembly 14).

Another group of permanent magnets 47 also mounts to the outer annulus 45 of the rotor 37. More specifically, the annulus 45 has an annular extension 50 that extends toward and overlaps a portion of the turbine, specifically the ends of turbine blades 51 on the turbine. Longitudinal grooves 52 are cut in the outer surface of the extension 50 to carry longitudinally extending, closely spaced, radially poled magnets 47. These magnets 47 also produce a field with a north-south magnetic axis lying along a chord near the periphery of the rotor 37.

In addition to the turbine blades 51, the turbine 40 carries an exciter blade 53 of a permeable material and a diametrically opposed, non-permeable, balancing blade (not shown). An outer ring band, or shroud, 54 fits over the turbine blade 51, the exciter blade 53, and the balancing blade. The band 54 engages a flat collecting ring 55 of a permeable material between the band 54 and a radial extension 56 on the turbine 40. The ring 55 bears against a tab 57 from the exciter blade 53 and a similar tab from the balancing blade.

Each time the magnets 47 pass the exciter blade 53, flux linkages are coupled to the coil 17 through the exciter blade 53 and the flux collection ring 55 and induce an electrical step pulse in the sensing coil 17 that indicates the passage of another predetermined point on the rotor 37 (i.e., the location of the magnet 47) past a predetermined point on the turbine (i.e., the position of the exciter blade 53). The time between the start and stop pulses is representative of flow rate.

Figure 2:
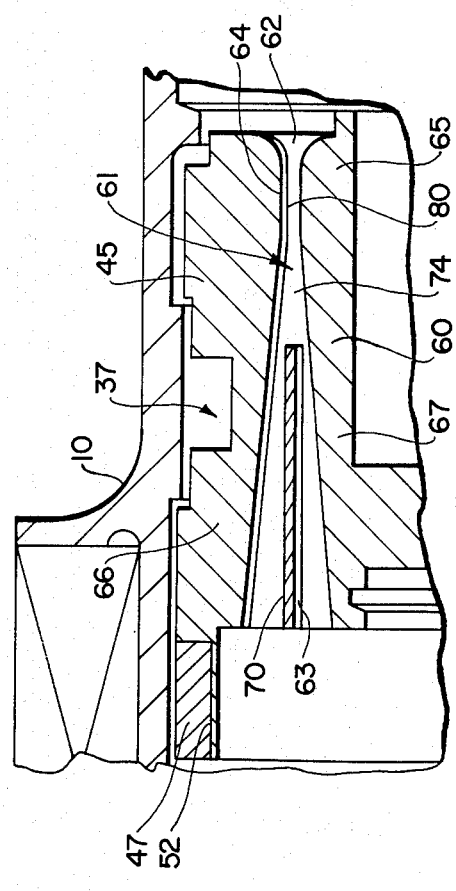
FIG. 2 is an enlarged partial view, in cross-section, of portions of the mass rate of flow meter shown in FIG. 1 that illustrates one aspect of this invention.

FIG. 2 discloses a longitudinal view, in cross-section, taken through the upper portion of the unrestrained rotor 37 and the housing 10 that is constructed to improve the performance of the flowmeter over wide temperature variations by reducing changes in flow profile that otherwise occur in fluid exiting the rotor relative to that entering the rotor.

The unrestrained rotor 37 includes the outer annulus 45 and a hub 60 between which the fluid stream is conveyed through tapered passages, such as the passage 61. These passages are arranged in a circle thereby to form an annulus of passages around the rotor 37. Each tapered passage has an inlet section 62 that receives the fluid stream from the swirl generator and an outlet section 63 through which fluid flows toward the restrained reaction turbine 40.

The inlet section 62 of the tapered passages 61 is formed by a section 64 of the outer annulus 45 that converges with a section 65 of the hub 60. The outlet section 63 of the tapered passages 61 is formed by a section 66 of the outer annulus 45 that diverges from a section 67 of the hub 60. A splitter vane 70 may be interposed in the diverging outlet section of the tapered passage. This vane 70 is centered in the outer section 63 of the tapered passage 61 for maintaining flow stability.

Figure 3:
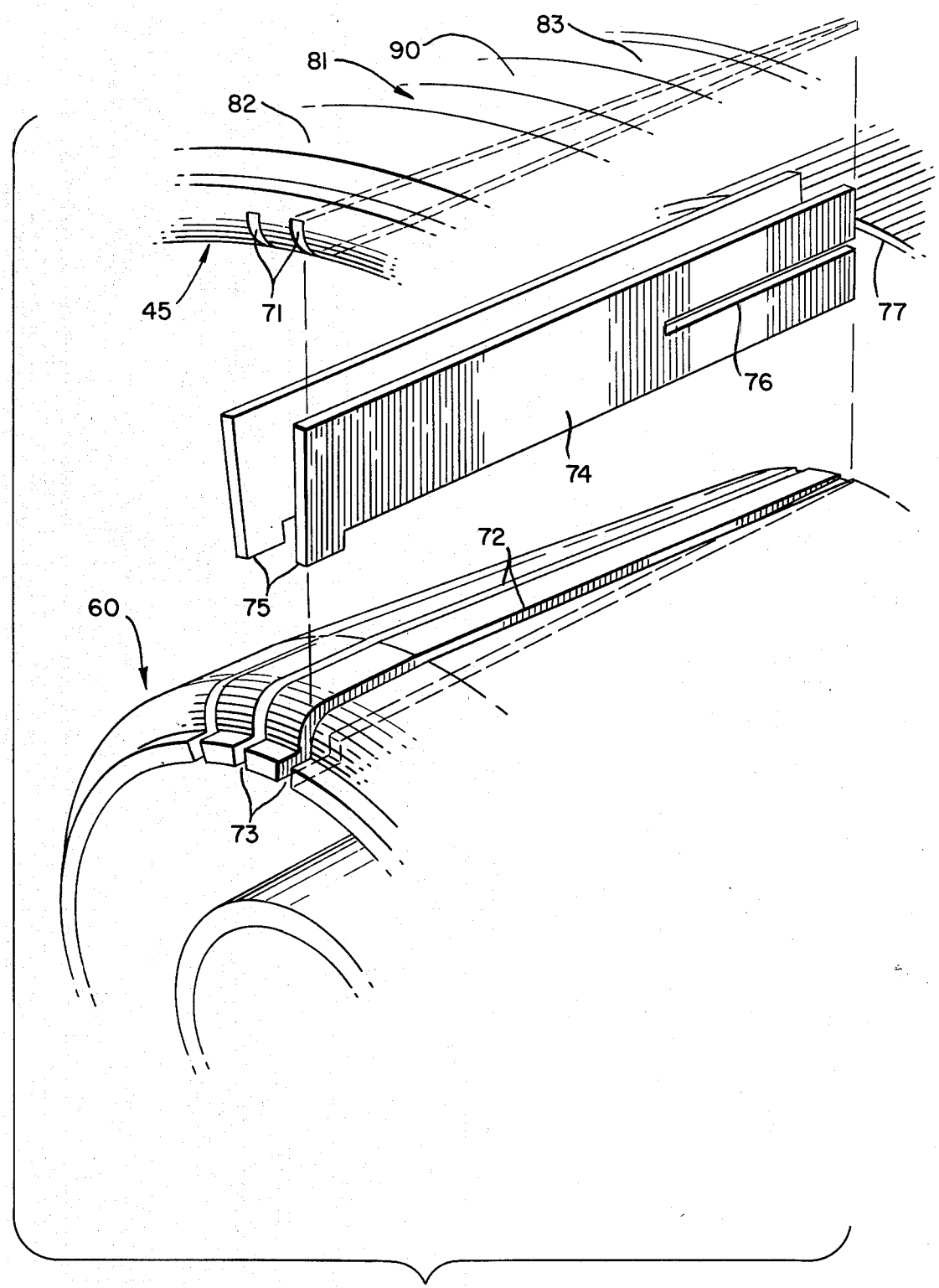
FIG. 3 is a perspective view of a portion of the rotor shown in FIG. 2.

Referring to FIG. 3, radially aligned, circumferentially spaced grooves 71 and 72 are machined into the outer annulus 45 and the inner hub 60, respectively. At the inlet end of the rotor, each groove 72 is notched through to form a radial slot 73. Each pair of radially aligned slots 71 and 72 supports a divider plate 74 that defines the circumferential limits of each passage.

Each divider plate 74 has a tab 75 that fits into a corresponding one of the radial slot 73. There also is formed in each divider plate 74 a longitudinally extending slot 76. When all the plates 74 are installed, the locus of the slots 76 defines a circumferential support for a cylinder 77. The portion of the cylinder 77 between adjacent divider plates 74 constitutes the vane 70 in the passage.

The reduction of the inlet section 62 to a small diameter at 80 in FIG. 2 causes all the fluid to pass through an area that is more accurately defined by a constant radius of gyration. Moreover, the fluid flow through the narrow passage at 80 tends to minimize any eddies or other influences that detract from a uniform and constant flow profile even as viscosity changes. The diverging outlet section 63 permits the flow to expand, thereby lowering the uniform velocity of fluid presented to the turbine 40. The splitter vane 70 assists in maintaining flow stability by preventing further change in flow profile. As a result, the angular velocity of the rotor 37 becomes less dependent upon viscosity so the effect of this source of possible error is greatly reduced.

Figure 4:
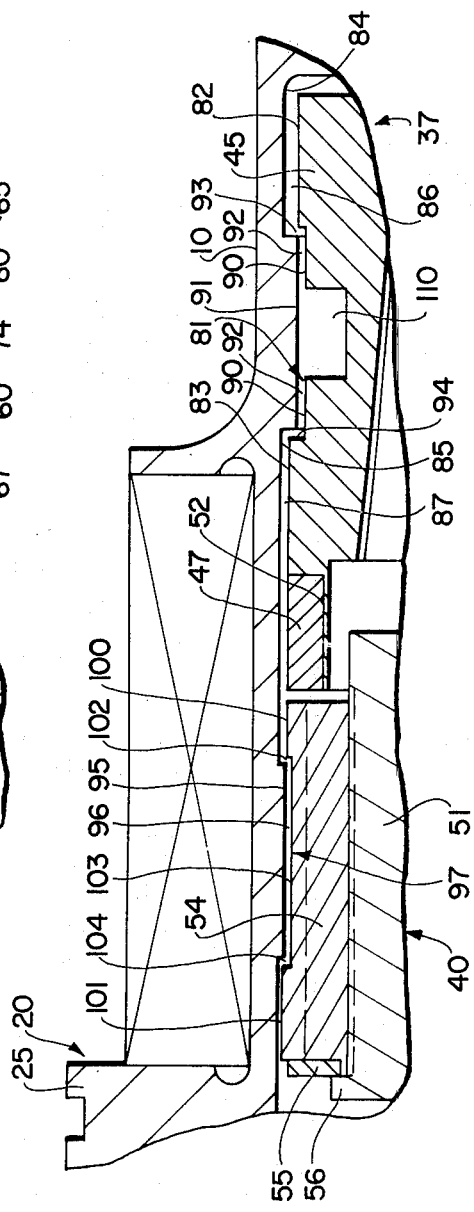
FIG. 4 is an enlarged partial view, in cross-section, of portions of the mass rate of flow meter shown in FIG. 1 that illustrates another aspect of this invention.

Leakage is reduced by the use of double labyrinth seals that are shown in FIG. 4. A double labyrinth comprises two sets of seals each of which includes two parallel, offset channels and an interconnecting perpendicular channel between them. Fluid must therefore pass through two ninety-degree bends to pass through the seal. Thus, in a double labyrinth seal the fluid must pass through four ninety-degree bends.

Referring first to the rotor 37, a double labyrinth seal 81 is disposed in the clearance between the outer annulus 45 of the rotor 37 and the housing 10. More specifically, the outer annulus 45 includes outer surfaces 82 and 83 of a maximum radius. These surfaces are separated from corresponding inner surfaces 84 and 85 of the housing 10 by clearances 86 and 87. A circumferential channel 90 is machined in the outer annulus 45 and a radially extending sealing ring 91 is formed in the housing 10. The radial depths of the channel 90 and sealing ring 91 exceed the radial clearance 87 and approximate the radial clearance 86. Thus, a longitudinal clearance passage 92 is formed between the outer surface of the channel 90 and the sealing ring 91. The passage 92 is parallel to and radially offset from the passage 87 and is interconnected to it by radially extending passage 94. The passage 92 is parallel to the passage 86 and interconnected to it by passage 93. In FIG. 4, the passages 86, 93, and 92 form one labyrinth seal; the passages 92, 94, and 87, the second labyrinth seal. Thus, the double labyrinth seal 81 of the rotor is formed by two axially displaced labyrinth seals. Additionally, an annular notch 110 is machined in the outer annulus 45 of the rotor 37 to a radial depth greater than that of the circumferential channel 90.

There is a similar construction at the turbine 40, except for the notch 110. A radially extending sealing ring 95 in the housing 10 and a channel 96 in the outer surface of the ring 54 provide double labyrinth seal 97. Specifically, the sealing ring 95 interrupts longitudinal passages 100 and 101 (passages 100 and 87 interconnect). Longitudinal passage 103 is formed between the sealing ring 95 and the channel 96, and is parallel to passages 100 and 101 and radially offset from passage 101. A passage 102 interconnects the passages 100 and 103; a radial passage 104 interconnects passages 103 and 101. Fluid must flow from the passage 100 through the passage 102 to the passage 103. From the passage 103, fluid flows through radial passage 104 to passage 101.

Each of the double labyrinth seals 81 and 97 interrupts axial or longitudinal leakage between the rotating rotor 37 and turbine 40 and the housing 10. This, by itself, tends to reduce leakage even when the turbine 40 is stationary. When the rotor 37 turns, an even greater impediment to longitudinal flow is provided because the fluid in the clearances tends to rotate with the rotor and produces a barrier-like area to such flow. The reductions in leakage through these clearances are significant. The leakage becomes low as a percentage of flow even at low flow rates. Moreover, leakage tends to become essentially independent of fuel viscosity. As a result, changes in leakage do not adversely affect the fuel flow rate measurement.

The notch 110 in the outer annulus 45 of the rotor 7 further decreases leakage by providing an additional interruption to axial leakage. That is, some fluid in the passage 92 diverts into the notch 110 instead of flowing axially through the passage 92. Moreover, the notch causes turbulence in the fluid flow that also decreases leakage. As the rotor 37 turns, the notch 110 produces an additional impediment to axial flow by affording another area where accumulating fluid has a barrier-like effect.

This double labyrinth seal construction also facilitates assembly of the flowmeter. Referring to FIG. 4, the radius of the rotor 37 at the passage 86 is selected to allow the rotor to clear the sealing ring 91. Consequently the rotor 37 can readily be inserted axially into position within the housing 10. When two separately sealed rotating bodies are inserted within a housing, the same ease of assembly can be realized. In FIG. 4 the rotor 37 and the turbine 40 constitute separate rotating bodies. The rotor 37 can clear the sealing ring 95 associated with the turbine 40 because the radius of the rotor 37 at the passage 87 is less than the radius at the sealing ring 95. Similarly, the radius of the shroud 54 on the turbine 40 at the passage 100 is less than the radius of the sealing ring 95. Consequently both the rotor 37 and turbine 40 clear the sealing ring 95 to facilitate the assembly of both elements in the housing 10.

In summary, there is disclosed a mass rate of flow meter that operates with reduced sensitivity to changes of operating temperature and to changes in flow rate. A specific embodiment of a rotor passage and specific embodiments of seals are disclosed. It will be apparent, however, that other specific embodiments can be implemented with the achievement of some or all or the advantages of this invention. Therefore, it is the object of the appended claims to cover all such variations and modifications of this invention as come within the true spirit and scope of this invention.

What is claimed as new and desired to be secured by Letters Patent of the United States is:

1. In a mass rate of flow meter of the angular momentum type having a housing, a swirl generator for imparting angular momentum to the measured fluid stream, a rotor downstream from the swirl generator, the rotor being rotated by the fluid from the swirl generator, and a restrained reaction turbine downstream from the rotor that removes angular momentum from the swirling fluid exiting the rotor, the rotor and turbine each being journaled on a shaft and including an inner hub and outer annulus, the improvement comprising at least one tapered, flow-conveying passage in the rotor having a substantially converging inlet section for imparting a uniform flow velocity to incoming fluid from the swirl generator and a substantially diverging outlet section downstream from said converging inlet sections for decreasing the uniform velocity by expanding the outgoing fluid stream.

2. A mass rate of flow meter as recited in claim 1, wherein a said converging inlet section of said tapered, flow-conveying passage comprises converging surfaces of said outer annulus and said inner hub of the rotor and a said diverging outlet section comprises diverging surfaces of a said outer annulus and said inner hub of the rotor.

3. A mass rate of flow meter as recited in claim 2 wherein a said tapered, flow-conveying passage includes splitter vane means centered in said diverging outlet section for maintaining flow stability.

4. A mass rate of flow meter as recited in claim 2 wherein said outer annulus and said inner hub support a plurality of circumferentially spaced, radially extending divider plate means for defining a plurality of longitudinal passages through the rotor.

5. A mass rate of flow meter as recited in claim 4 wherein each of said divider blade means includes a longitudinal slot therethrough, coextensive with the outlet sections, all of said slots defining a cylinder, the rotor additionally including a cylinder supported by said divider blades whereby said cylinder forms a splitter vane between said divider blades in each passage for stabilizing the fluid flow through the passage.

6. A mass rate of flow meter of the angular momentum type having a housing, a rotating assembly mounted with and spaced from the housing, a swirl generator for imparting angular momentum to the measured fluid stream, said rotating assembly including a rotor element downstream from the swirl generator which is rotated by the fluid from the swirl generator, and a restrained, partially rotatable, reaction turbine element downstream from the rotor that removes angular momentum from the swirling fluid exiting the rotor with the partial rotational displacement of the turbine being a measure of the mass rate of flow, the rotor and turbine each being journaled on a shaft defining their axis of rotation, the improvement comprising at least one double labyrinth sealing means formed between the housing and one of said rotor or turbine elements for impeding the flow of fluid there between, said housing and said rotating element having cooperating projections and surfaces to define;
  (a) a first pair of interconnected, longitudinal, radially offset passages between the housing and one of said elements;
  (b) a second pair of interconnected, longitudinal, radially offset passages, between said housing and said rotating element and axially displaced from said first pair, one of said longitudinal passages in said second pair being at the same radial distance from the axis of rotation as one of the longitudinal passages in said first pair the passages at the same radial distance being axially interrupted, and the remaining longitudinal passages in each pair being at different radial distances from the axis of rotation whereby the horizontal passages in the double labyrinth seal are located at least at three different radial distances from the axis of rotation to facilitate axial removal and insertion of the rotating assembly.

7. A mass rate of flow meter as recited in claim 6 wherein said double labyrinth sealing means includes an annular channel formed in the rotor and a radially extending sealing ring formed in the housing positioned between the said axially interrupted passages.

8. A mass rate of flow meter as recited in claim 6 wherein said double labyrinth sealing means includes an annular channel formed in the turbine and a radially extending sealing ring formed in the housing.

9. A mass rate of flow meter as recited in claim 8 additionally comprising a second double labyrinth sealing means formed by the rotor and the housing.

10. A mass rate of flow meter as recited in claim 6 wherein said rotor includes at least one tapered, flow-conveying passage having a substantially converging inlet section for imparting uniform velocity to the fluid stream and a substantially diverging outlet section for decreasing the uniform velocity by expanding the outgoing fluid stream.

11. A mass rate of flow meter as recited in claim 10 wherein a said tapered, flow-conveying passage includes splitter vane means centered in said diverging outlet section for maintaining flow stability.

12. A double labyrinth seal for inhibiting longitudinal flow of a fluid between a housing and an assembly that is spaced from the housing and adapted for rotation within said housing, said seal comprising:
  Said housing and said assembly having cooperative projections and surfaces to define:
  (a) a first pair of interconnected, longitudinal, radially offset passages between the housing and the rotating assembly,
  (b) a second pair of interconnected, longitudinal passages, between said housing and said rotating assembly, and axially displaced from said first pair, one of the longitudinal passages in the second pair being at the same radial distance from the axis of rotation as one of the longitudinal passages in said first pair said passages at the same radial distance being axially interrupted, and the remaining longitudinal passages in each pair being at different radial distances from the axis of rotation whereby the horizontal passages in the double labyrinth seal are at least at three different radial distances from the axis of rotation to facilitate axial removal and insertion of the rotating assembly.

13. A double labyrinth seal as recited in claim 12 further comprising an annular channel formed in the inner assembly and a radially extending sealing ring formed in the housing positioned between the said axially interrupted passages.

* * * * *